US011297708B2

(12) United States Patent
Zhang

(10) Patent No.: US 11,297,708 B2
(45) Date of Patent: Apr. 5, 2022

(54) SYSTEM AND METHOD FOR LIGHTING CONTROL

(71) Applicant: SHANGHAI TRUTHVISION INFORMATION TECHNOLOGY CO., LTD., Shanghai (CN)

(72) Inventor: Zhong Zhang, Great Falls, VA (US)

(73) Assignee: SHANGHAI TRUTHVISION INFORMATION TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 16/922,982

(22) Filed: Jul. 7, 2020

(65) Prior Publication Data

US 2020/0337140 A1    Oct. 22, 2020

Related U.S. Application Data

(63) Continuation of application No. PCT/CN2019/083759, filed on Apr. 23, 2019.
(Continued)

(51) Int. Cl.
*H05B 47/125* (2020.01)
*H05B 47/105* (2020.01)
(Continued)

(52) U.S. Cl.
CPC ............. *H05B 47/11* (2020.01); *H05B 45/20* (2020.01); *H05B 47/105* (2020.01);
(Continued)

(58) Field of Classification Search
None
See application file for complete search history.

(56) References Cited

U.S. PATENT DOCUMENTS 7,228,429 B2    6/2007  Monroe
2007/0285510 A1*  12/2007  Lipton ............. G08B 13/19689
                                                   348/135
(Continued)

FOREIGN PATENT DOCUMENTS

CN    101635057 A    1/2010
CN    102946663 A    2/2013
(Continued)

OTHER PUBLICATIONS

International Search Report in PCT/CN2019/083759 dated Aug. 26, 2019, 5 pages.
(Continued)

*Primary Examiner* — Dedei K Hammond
(74) *Attorney, Agent, or Firm* — Metis IP LLC

(57) ABSTRACT

The system for lighting control may include a non-transitory storage medium storing executable instructions for lighting control, a communication component operatively connected to the non-transitory storage medium, at least one imaging device configured to capture images related to an area, and one or more illuminating device configured to light the area. The system may also include at least one processor in communication with the non-transitory storage medium. When executing the set of instructions, the at least one processor may cause the system to obtain image data relating to an area captured by the at least imaging device and determine at least one parameter relating to at least one of the one or more illuminating devices. The system may further include a control component configured to operate the at least one of the one or more illuminating devices to light the area based on the determined at least one parameter.

19 Claims, 9 Drawing Sheets

Related U.S. Application Data

(60) Provisional application No. 62/664,076, filed on Apr. 27, 2018.

(51) Int. Cl.

| | | |
|---|---|---|
| *H05B 47/19* | (2020.01) | |
| *H05B 45/20* | (2020.01) | |
| *H05B 47/11* | (2020.01) | |
| *H05B 47/155* | (2020.01) | |
| *H05B 45/22* | (2020.01) | |
| *H05B 45/12* | (2020.01) | |
| *G06T 7/20* | (2017.01) | |

(52) U.S. Cl.
CPC ......... *H05B 47/125* (2020.01); *H05B 47/155* (2020.01); *H05B 47/19* (2020.01); *G06T 7/20* (2013.01); *H05B 45/12* (2020.01); *H05B 45/22* (2020.01)

(56) References Cited

U.S. PATENT DOCUMENTS

| | | | |
|---|---|---|---|
| 2012/0248992 A1 | 10/2012 | Jeon et al. | |
| 2012/0319597 A1 | 12/2012 | Park et al. | |
| 2013/0107041 A1 | 5/2013 | Norem et al. | |
| 2013/0229525 A1 | 9/2013 | Nagaoka et al. | |
| 2013/0346229 A1* | 12/2013 | Martin | G06F 8/61 705/26.3 |
| 2014/0001955 A1 | 1/2014 | Bouffay et al. | |
| 2014/0374602 A1* | 6/2014 | Falcone et al. | H04N 5/33 |
| 2016/0078904 A1 | 3/2016 | Yamaji et al. | |
| 2018/0061065 A1 | 3/2018 | Mayuzumi | |

FOREIGN PATENT DOCUMENTS

| | | | |
|---|---|---|---|
| CN | 103824114 A | 5/2014 | |
| CN | 104264493 A | 1/2015 | |
| CN | 104470137 A | 3/2015 | |
| CN | 104537860 A | 4/2015 | |
| CN | 104284493 A * | 5/2015 | ............. Y02B 20/40 |
| CN | 204350385 U | 5/2015 | |
| CN | 104835186 A | 8/2015 | |
| CN | 107241839 A | 10/2017 | |
| CN | 107360654 A | 11/2017 | |
| CN | 107426894 A | 12/2017 | |
| CN | 107705574 A | 2/2018 | |
| CN | 107770921 A | 3/2018 | |
| CN | 107846761 A | 3/2018 | |
| EP | 2009398 A2 | 12/2008 | |

OTHER PUBLICATIONS

Written Opinion in PCT/CN2019/083759 dated Aug. 26, 2019, 4 pages.
Wang, Hui et al., Light Network System Based on Intelligent Video Analysis, Industrial Control Computer, 30(4): 21-23, 2017.

* cited by examiner

300

800

SYSTEM AND METHOD FOR LIGHTING CONTROL

CROSS-REFERENCE TO RELATED APPLICATIONS

This application is a continuation of International Application No. PCT/CN2019/083759, filed on Apr. 23, 2019, which claims priority to U.S. Provisional Application No. 62/664,076, filed on Apr. 27, 2018, the contents of each of which are hereby incorporated by reference.

TECHNICAL FIELD

The present disclosure generally relates to smart lighting systems, and more specifically relates to methods and systems for controlling lighting based on images.

BACKGROUND

Video surveillance systems are widely used in a variety of applications to detect and monitor subjects within an environment. For example, in security applications, such systems are employed to detect and track individuals or vehicles entering or leaving a building facility or a security gate, or to monitor individuals within a store, office building, hospital, or other such setting where the health and/or safety of the occupants may be of concern. In some embodiments, the video surveillance systems may include a plurality of cameras. The install of the plurality of the cameras may cost a lot, especially in power supply. Illuminating systems are widely installed in various areas including rooms, streets, roads, parking lots, etc. The illuminating systems may include a plurality of illuminating devices powered by a power source. However, the illuminating system are usually controlled by instructions inputted by user or according to default setting of the illuminating systems. It is desirable to provide systems and methods for control lighting based on images.

SUMMARY

According to an aspect of the present disclosure, a system for lightening control may include a non-transitory storage medium storing executable instructions for lighting control, a communication component operatively connected to the non-transitory storage medium, at least one imaging device configured to capture images related to an area, and one or more illuminating device configured to light the area. The system may also include at least one processor in communication with the non-transitory storage medium. When executing the set of instructions, the at least one processor may cause the system to obtain image data relating to an area captured by the at least imaging device and determine at least one parameter relating to at least one of the one or more illuminating devices. The system may further include a control component configured to operate the at least one of the one or more illuminating devices to light the area based on the determined at least one parameter.

In some embodiments, the control component may be further configured to set the at least one parameter relating to the at least one of the one or more illuminating devices. The at least one parameter may include a switch state of the at least one of the one or more illuminating devices, a light intensity of the at least one of the one or more illuminating devices, a lighting area of the at least one of the one or more illuminating devices, a light color of the at least one of the one or more illuminating devices, or the like, or a combination thereof.

In some embodiments, each of the one or more illuminating devices may include a plurality of light emitting diodes (LEDs). Each of the plurality of light emitting diodes (LEDs) may be operated independently by the control component.

In some embodiments, the control component may be further configured to adjust a lighting parameter relating to at least one of the plurality of light emitting diodes.

In some embodiments, the at least one processor may be further directed to obtain historical image data of the area from a database; and determine the at least one parameter relating to at least one of the one or more illuminating devices based on the captured image data and the historical image data.

In some embodiments, the at least one processor may be further directed to determine a type of a subject in the captured image data and determine the at least one parameter relating to at least one of the one or more illuminating devices based on the type of the subject.

In some embodiments, the at least one processor may be further directed to determine a breakdown of the one or more illuminating devices based on the captured image data.

In some embodiments, the at least one processor may be further directed to receive instructions from one or more user terminals via the communication component and determine the at least one parameter relating to at least one of the one or more illuminating devices based on based on the instructions.

In some embodiments, the at least one processor may be further directed to determine whether the captured image data include a motion subject; and in response to a determination that the captured image data include a motion subject, the control component may be configured to operate the at least one imaging device to track the motion subject, and operate the one or more illuminating devices to light the area based on a moving track of the motion subject.

In some embodiments, the control component may be coupled to at least one of the one or more illuminating devices.

In some embodiments, the at least one imaging device may be coupled to at least one of the one or more illuminating devices and share a power source with the at least one of the one or more illuminating devices.

According to another aspect of the present disclosure, a computer-implemented method may include one or more of the following operations performed by at least one processor. The method may include obtaining image data relating to an area captured by at least one imaging device and determining whether the captured image data includes one or more subjects. The method may also include determining one or more parameters relating to each of the one or more illuminating device based on the determination whether the captured image data includes one or more subjects. The method may further include operating the one or more illuminating devices to light the area based on the one or more parameters.

According to yet another aspect of the present disclosure, a non-transitory computer-readable storage medium storing instructions that, when executed by at least one processor of a system, cause the system to perform a method. The method may include obtaining image data relating to an area captured by at least one imaging device and determining whether the captured image data includes one or more subjects. The method may also include determining one or more parameters relating to each of the one or more illuminating device based on the determination whether the captured image data includes one or more subjects. The method may further include operating the one or more illuminating devices to light the area based on the one or more parameters.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by other expression if they achieve the same purpose.

Figure 8:
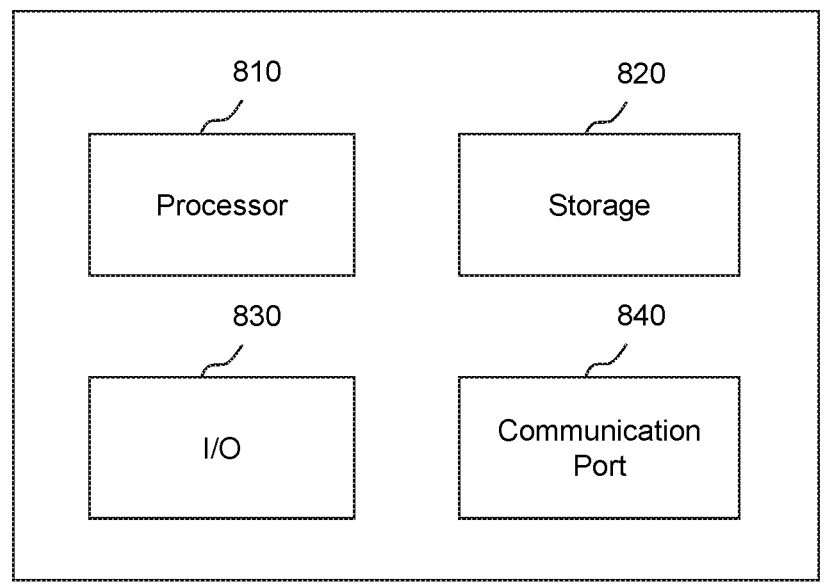
FIG. 8 is a schematic diagram illustrating exemplary hardware and/or software components of an exemplary computing device on which the processing engine may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 810 as illustrated in FIG. 8) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

A system for lightening control may include a non-transitory storage medium storing executable instructions for lighting control, a communication component operatively connected to the non-transitory storage medium, at least one imaging device configured to capture images related to an area, and one or more illuminating device configured to light the area. The system may also include at least one processor in communication with the non-transitory storage medium. When executing the set of instructions, the at least one processor may cause the system to obtain image data relating to an area captured by the at least imaging device and determine at least one parameter relating to at least one of the one or more illuminating devices. The system may further include a control component configured to operate the at least one of the one or more illuminating devices to light the area based on the determined at least one parameter.

Figure 1:
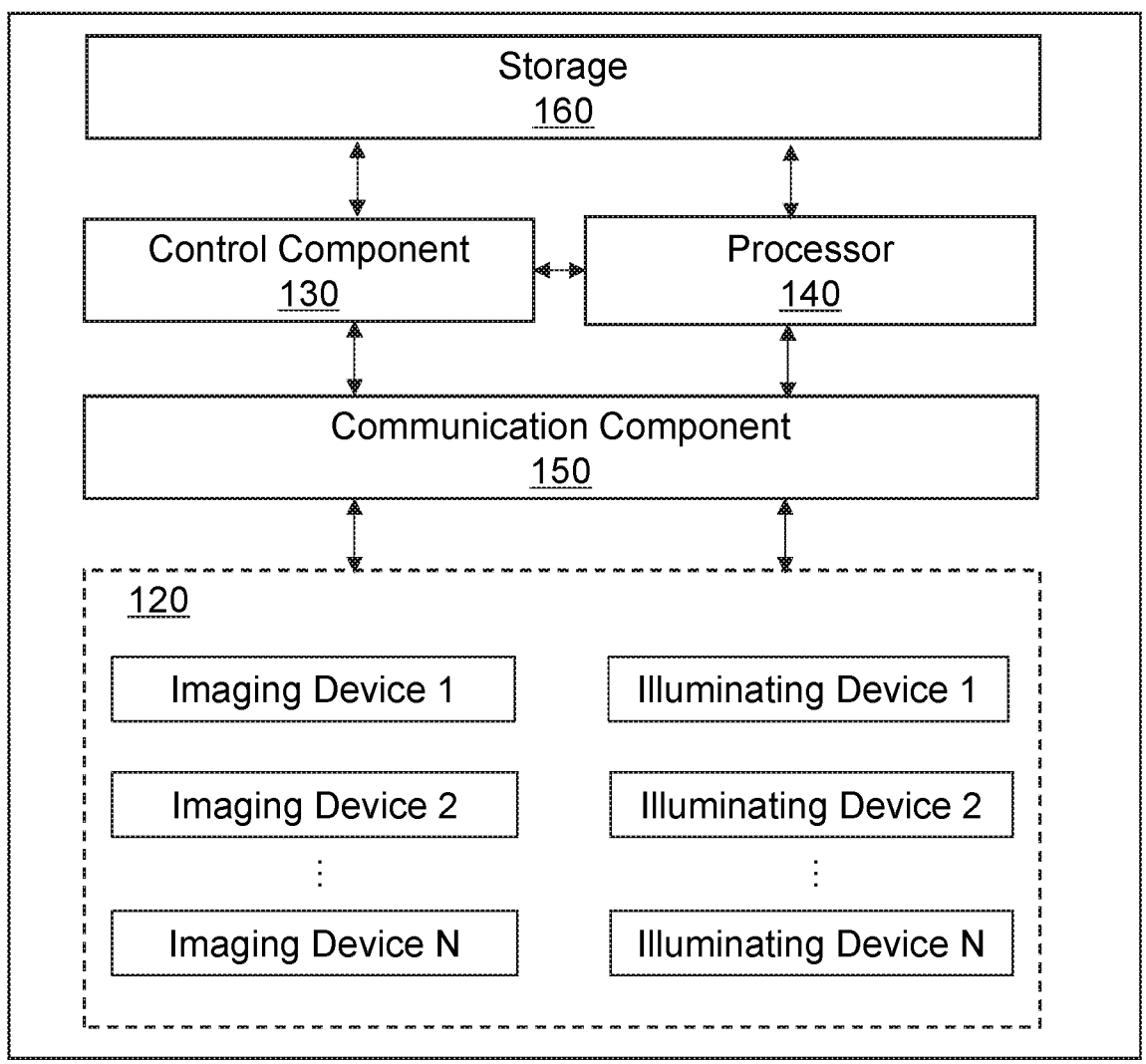
FIG. 1 is a schematic diagram illustrating an exemplary lighting-surveillance system according to some embodiments of the present disclosure.

FIG. 1 is a schematic diagram illustrating an exemplary lighting-surveillance system 100 according to some embodiments of the present disclosure. As shown, the lighting-surveillance system 100 may include one or more lighting-imaging components 120, a control component 130, a processor 140, a communication component 150, and a storage 160. In some embodiments, the lighting-imaging component 120, the control component 130, and the processor 140, and the storage 160 may be connected to and/or communicate with each other via the communication component 150 including a wireless connection (e.g., a network), a wired connection, or a combination thereof.

The lighting-imaging component 120 may include one or more illuminating devices (e.g., an illuminating device 1, 2, . . . , N) and one or more imaging devices (e.g., an imaging device 1, 2, . . . , N). The number of the imaging devices and the number of the illuminating devices may be different or the same. In some embodiments, each of the imaging devices may be coupled with one of the illuminating devices. For example, a public area may include a plurality of illuminating devices. Each of the plurality of illuminating devices may be installed with one imaging device. The coupled imaging device and illuminating device (also referred to as lighting-imaging device) may share one single power source. For example, a lighting-imaging device may include a base portion that screws into a light socket. The imaging device and the illuminating device of the lighting-imaging device may powered by the light socket. In some embodiments, one of at least one portion of the illuminating devices may be coupled with one imaging device. For example, sides of roads may be configured with a plurality of illuminating devices. The illuminating devices located at crossroads of the roads may be installed with imaging devices.

The illuminating devices may be configured to light an area of interest (AOI). In some embodiments, the AOI may be indoor or outdoor. For example, the AOI may include a room, a parking lot, a shopping mall, a street, a park, a subway station, etc. The subject may be organism or non-organism. For example, the subject may include a person, a vehicle, an animal, a physical subject, or the like, or a combination thereof. Each of the illuminating devices may include one or more lighting parameters. Exemplary lighting parameters may include a light intensity, a light color, a color temperature, a shape of light source, a brightness, a switch state, a lighting area, etc. In some embodiments, at least one of the illuminating devices may include a plurality of light-emitting diodes (LEDs). Each of the plurality of LEDs may be independent from each other. In other words, light parameters of each of the plurality of LEDs may be set respectively.

The imaging devices may be positioned to perform surveillance of an area of interest (AOI). In some embodiments, an imaging device may include a video camera. As used herein, a video camera may refer to an apparatus for visual recording. The video camera may capture image data relating to an AOI or a subject of interest. The image data may include a video, an image, or a combination thereof. As used herein, the term "video" may refer to motion pictures represented in analog and/or digital form. For examples, a video may include television, movies, image sequences from a camera or other observer, computer-generated image sequences, or the like, or a combination thereof. As used herein, a sequence (also referred to as a frame) may refer to a particular image or other discrete unit within a video. The video camera may include a color camera, a digital video camera, a camera, a camcorder, a PC camera, a webcam, an infrared (IR) video camera, a low-light video camera, a thermal video camera, a CCTV camera, a pan, a tilt, a zoom (PTZ) camera, a video sensing device, or the like, or a combination thereof.

The control component 130 may be configured to control the operation of one or more components of the lighting-surveillance system 100. In some embodiments, the control component 130 may operate one or more imaging devices to capture image data (e.g., an image, a video, etc.) relating to one or more areas. For example, the control component 130 may set one or more parameters (e.g., a rotation direction, a rotation angle, etc.) of an imaging device. The control component 130 may further control the processor 140 to process the image data to detect one or more motion subjects. For example, the control component 130 may control the processor 140 to determine a distance between the detected motion subject and one or more imaging devices which may capture images including the motion subject. As another example, the control component 130 may control the processor 140 to determine a moving track based on image data captured by one or more imaging devices.

In some embodiments, the control component 130 may operate one or more illuminating devices to light the areas. For example, the control component 130 may set one or more lighting parameters (e.g., a switch state, a lighting area, a light color, a light intensity, etc.) of a plurality of LEDs in an illuminating device. As another example, the control component 130 may operate at least one of the plurality of LEDs to light the areas associated with the illuminating device according to one or more lighting parameters (e.g., a switch state, a lighting area, a light color, a light intensity, etc.).

In some embodiments, the control component 130 may operate one or more illuminating devices based on an instruction inputted by a user via a terminal (e.g., a mobile phone). In some embodiments, the control component 130 may operate one or more illuminating devices based on image data captured by the imaging devices associated with the illuminating devices. For example, the control component 130 may control the processor 140 to determine whether a captured image includes a subject (e.g., a person, a vehicle, etc.). The component 130 may operate one or more illuminating devices to light the area the subject located if the processor 140 determines that the captured image includes the subject (e.g., a person, a vehicle, etc.). Further, the control component 130 may control the processor 140 to determine the type (e.g., a vehicle, a pedestrian, an adult, a child, a woman, a man, etc.) of a subject in a captured image. The control component 130 may operate one or more illuminating devices based on the type of the subject. As a further example, the control component 130 may decrease the light intensity of an illuminating device if the processor 140 determines that the detected subject is a vehicle. As a still example, the control component 130 may control the processor 140 to determine whether a motion subject is represented in a video acquired by an imaging device. The control component 130 may operate other imaging devices to track the detected motion subject. Further, the control component 130 may further operate one or more illuminating devices to light one or more areas according to the moving track of the detected motion subject. In some embodiments, the control component 130 may operate an illuminating device based on historical image data acquired by an imaging device associated with the illuminating device. For example, the control component 130 may control the processor 140 to determine a visitor flow or vehicle flow at a specific period based on the historical image data acquired by an imaging device. Further, the control component 130 may operate an illuminating device to light the area associated with the imaging device.

In some embodiments, the control component 130 may operate a first illuminating device based on the operation of a second illuminating device adjacent from the first illuminating device. For example, the control component 130 may turn on the first illuminating device if the processor 140 determines that the second illuminating device has been turned on. In some embodiments, the control component 130 may determine a breakdown of an illuminating device based on image data captured by an imaging device associated with the illuminating device.

The control component 130 may be implemented in numerous ways including but not limited to dedicated hardware, software, or the like, or a combination thereof, to perform various functions. In some embodiments, the control component 130 may be implemented by mobile devices which may be network enabled, such as, a mobile phone, a smart mobile phone, a tablet pc, a laptop computer, a personal digital assistant, or the like. In some embodiments, other network-enabled devices such as a desktop computer may also be used as a control component 130. In some embodiments, the control component 130 may be further an application which may be operated on a mobile device or a fixed device, such as a smart mobile phone, a tablet pc, a desktop computer, a personal digital assistant or the like. In some embodiments, a software application or upgrade may be downloaded on to a network-enabled device to perform the functions described herein In some embodiments, the control component 130 may be a server, and the sever may be a local or remote sever. In some embodiments, the control component 130 may be also an IR remote controller.

In some embodiments, the control component 130 may be integrated to at least one lighting-imaging component 120. In some embodiments, the control component 130 may be configured with a screen that allow a user to interact through touch with the control component 130, for example, to retrieve and navigate a play list of audio items, control operations one or more imaging devices and/or one or more illuminating devices.

The processor 140 may process data and/or information obtained from the lighting-imaging component 120, and/or the storage 160. For example, the processor 140 may obtain image data (e.g., an image, a video, etc.) from at least one imaging device of the lighting-imaging component 120 and/or the storage 160. As another example, the processor 140 may process the image data and determine one or more lighting parameters of an illuminating device based on the processed image data. In some embodiments, the processor 140 may be a workstation or server. For example, the processor 140 may be a single server or a server group. The server group may be centralized or distributed. In some embodiments, the processor 140 may be local or remote. For example, the processor 140 may access information and/or data stored in the lighting-imaging component 120 and/or the storage 160 via the communication component 150. As another example, the processor 140 may be directly connected to the lighting-imaging component 120 and/or the storage 160 to access stored information and/or data. In some embodiments, the processor 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The communication component 150 may be configured to establish communication links between the control component 130 and the lighting-imaging component 120. For example, the communication component 150 may reach a communication between the control component 130 and one or more imaging devices and/or illuminating devices. The communication component 150 may also be configured to establish communication links between devices in the lighting-imaging component 120. For example, the communication component 150 may reach a communication between one or more imaging devices and/or illuminating devices. In some embodiments, the communication component 150 may be also used to establish a communication link between the control component 130 and/or the processor 140 with a remote server for acquiring information from the remote server.

The communication component 150 may include a telephony network, a wireless network, a data network, a wired network, or the like, or a combination thereof. The communication component 150 may be wireless or wired, which may be managed by one or more service providers. The wireless network may include Bluetooth, WLAN, Wi-Fi, Zigbee, Z-Wave, EnOcean, infra-red data association (IrDA), Ultra Wideband (UWB), Near Field Communication Services (NFC), mobile networks (2G, 3G or 4G signal), VPN, shared network, or the like, or a combination thereof. The communication protocol may be Transmission Control Protocol (TCP), User Data Protocol (UDP), Internet Protocol (TP), Hypertext transfer Protocol (HTTP), File Transfer Protocol (FTP), Simple Mail Transfer protocol (SMTP), Post Office Protocl3 (POP3), or the like, or a combination thereof. The wired connection may include but not limited to RS-232, CAN, TCP/IP, optical fiber, or the like, or a combination thereof.

In some embodiments, the network may include some components or elements for providing a range of communication and network service. For example, telephony network may include a circuit-switched network, such as the public switched telephone network (PSTN), an integrated services digital network (ISDN), a private branch exchange (PBX), or other like network. The wireless network may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (Wi-Fi), satellite, and the like. Meanwhile, data network may be any local area network (LAN), metropolitan area network (MAN), wide area network (WAN), the Internet, or any other suitable packet-switched network, such as a commercially owned, proprietary packet-switched network, such as a proprietary cable or fiber-optic network.

In some embodiments, the communication component 150 may include one or more Wi-Fi routers. The Wi-Fi router may be configured to allow at least one lighting-imaging component 120 to connect with the control component 130. Further the Wi-Fi router may be configured to allow the control component 130 and the lighting-imaging component 120 to access to the communication component 150.

The storage 160 may store data, instructions, and/or any other information relating to a calibration of a camera based on image data captured by the camera. In some embodiments, the storage 160 may store data obtained from the processing engine 140, the terminals 160, and/or the monitoring device 120. For example, the storing module 110 may store image data relating to at least one scene acquired by the monitoring device 120. As another example, the storing module 110 may store parameters of a camera determined by the calibration module 108. As still another example, the storing module 110 may store one or more estimated values corresponding to one or more first features relating to subjects detected in image data. As still another example, the storage 160 may store one or more reference values corresponding to one or more first features relating to subjects. In some embodiments, the storage 160 may store data and/or instructions that the processing engine 140 may execute or use to perform exemplary methods described in the present disclosure. For example, the storage 160 may store instructions that the processing engine 140 may execute or use to determine target parameters of a camera. In some embodiments, the storage 160 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storing module 110 may be implemented on a cloud platform as described elsewhere in the disclosure. In some embodiments, the storage 160 may be connected to and/or to communicate with one or more other components in the processing engine 140. One or more components in the processing engine 140 may access the data or instructions stored in the storage 160.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. In some embodiments, the lighting-surveillance system 100 may be connected with a security system, a smart socket system, a smart switch system, a smart appliances system, or the like, or a combination thereof. Further the described systems may be all controlled via the control component 130. In some embodiments, the processor 140 and the control component 130 may be integrated into one single device.

Figure 2:
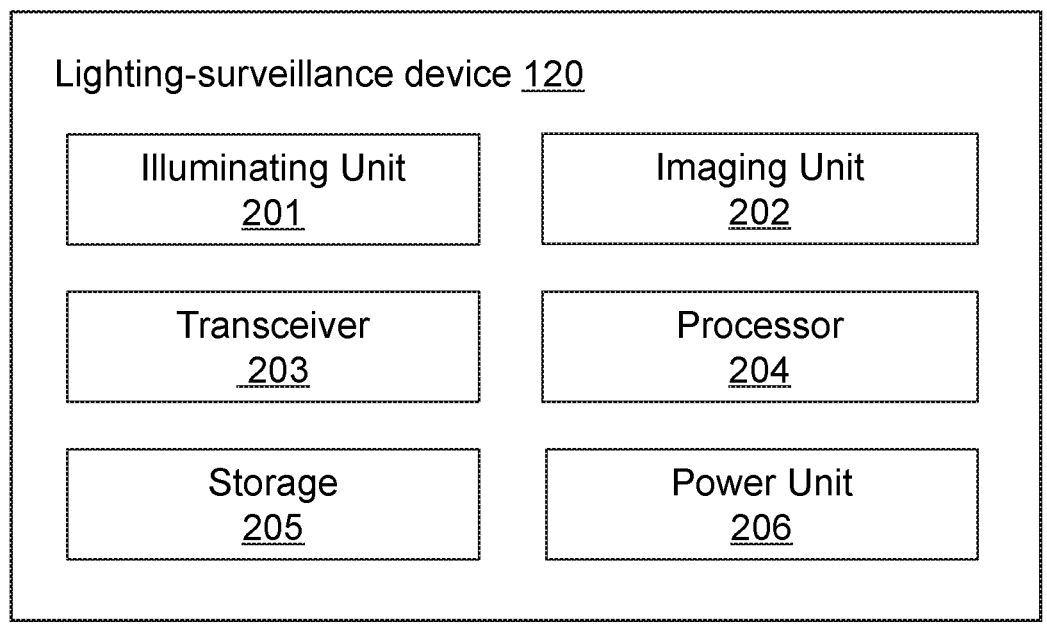
FIG. 2 is a schematic diagram illustrating an exemplary lighting-imaging component according to some embodiments of the present disclosure.

FIG. 2 is a schematic diagram illustrating an exemplary lighting-imaging component 120 according to some embodiments of the present disclosure. The lighting-imaging component 120 may include an illuminating unit 201, an imaging unit 202, a transceiver 203, a processor 204, a storage 205, and a power unit 206. In some embodiments, the illuminating unit 201, the imaging unit 202, the transceiver 203, the processor 204, the storage 205, and a power unit 206 may be connected to and/or communicate with each other via a wireless connection (e.g., a network), a wired connection, or a combination thereof.

The illuminating unit 201 may be configured to convert electric to lighting. The illuminating unit 201 may include a lighting source, a lighting driver, or the like, or a combination thereof. The lighting source may include a heat radiation light source, a gas discharge light source, a semiconductor light source, etc. The heat radiation light may include incandescent, halogen, etc. The gas discharge light source may include high-intensity discharge lamps, high pressure mercury lamps, metal halide lamps, high pressure sodium lamps, etc. The semiconductor light source may include one or more light emitting diodes (LEDs). According to the chemical nature, the LED may include organic light emitting diode (OLED) and inorganic light emitting diode (LED). According to control mode, the LED may include constant current, constant voltage, etc. According to dimming mode, the LED may include analog dimming, PWM dimming, etc. According to the color, LED may include red LEDs, blue LEDs, green LEDs, yellow LEDs, white LEDs, or a combination thereof, such as RGB. The LED may also include an ordinary monochromatic light-emitting diode, a high-brightness light-emitting diode, an ultra-high brightness light-emitting diode, a color light-emitting diode, a blinking light emitting diode, a voltage-controlled light-emitting diode, an infrared emitting diode, a negative resistance light-emitting diode, etc.

The imaging unit 202 may be configured to acquire image data relating to an AOI. The image data may include a video, an image, or a combination thereof. In some embodiments, the imaging unit 202 may include a video camera as described elsewhere in the present disclosure (e.g., FIG. 1 and the descriptions thereof). In some embodiments, the imaging unit 202 may include one or more imaging sensors. Exemplary imaging sensors may include a charge coupled device (CCD), a complementary metal-oxide semiconductor (CMOS), etc.

The transceiver 203 may be configured to transmit and receive data between the different modules, such as the illuminating unit 201, the imaging unit 202, the processor 204, the storage 205, and the power unit 206. The transceiver 203 may also configured to establish a communication between the control component 130, the processor 140, the communication component 150, and the lighting-imaging component 120. The transceiver 203 may establish a communication via a wireless connection, a wired connection, or a combination thereof. In some embodiments, the wireless connection may be based on an industry standard, (e.g., infrared, radio, wireless standards including IEEE 802.1a, 802.11 b, 802.11g, 802.11n, 802.15 and so on). In some embodiments, the transceiver 203 may be integrated in any module or unit of the lighting-imaging component 120.

The processor 204 may be configured to process data associated with the illuminating unit 201 and/or the imaging unit 202. For example, the processor 204 may detect one or more motion subjects based on images acquired by the imaging unit 201. As another example, the processor 204 may determine one or more lighting parameters based on the detected motion subjects. In some embodiments, the processor 204 may also be configured to control the various units in the lighting-imaging component 120 according to some instructions from the control component 130 or other units, such as the illuminating unit 201, the imaging unit 202, the transceiver 303, the storage 205, and the power unit 206. The processor 204 may include a microcontroller, a reduced instruction set computer (RISC), application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an acorn reduced instruction set computing (RISC) machine (ARM), any other circuit and/or processor capable of executing the functions described herein, or the like, or any combination thereof. The processor 204 may be implemented in numerous ways (e.g., such as with dedicated hardware) to perform various functions. The processor 204 may employ one or more microprocessors that may be programmed using software (e.g., microcode) to perform various functions discussed herein. The processor 204 may be implemented with or without employing a microprocessor, and also may be implemented as a combination of dedicated hardware to perform some functions and a processor (e.g., one or more programmed microprocessors and associated circuitry) to perform other functions. Examples of the processor components that may be employed in various embodiments of the present disclosure include, but are not limited to, conventional microprocessors, application specific integrated circuits (ASICs), and field programmable gate arrays (FPGAs).

The storage 205 may be any data storage that may be loaded with one or more software or instructions, which may be executed by the processor 204. For example, the data may include image data acquired by the imaging unit 202, one or more lighting parameters associated with the illuminating unit 201, instructions being implemented by the processor 204 causing the processor 204 to implement a method for lighting control, or the like, or a combination thereof. The storage 205 may include a hierarchical storage, a network storage, a relational storage, etc., as described elsewhere in the present disclosure (e.g., FIG. 1 and the descriptions thereof.)

The power unit 206 may be configured to provide power for the lighting-imaging component 120. In some embodiments, the power unit 206 may include a base portion for screwing into a light bulb socket. Further the illuminating unit 201 and the imaging unit 202 may be powered via a same base portion of the power unit 206. In some embodiments, the power unit 206 may include a battery, e.g., a lithium battery, a lead acid storage battery, a nickel-cadmium battery, a nickel metal hydride battery, or the like, or a combination thereof. In some embodiments, the power unit 206 may be connected with a smart light bulb socket. The smart light bulb socket may be connected with the control component 130 via a wireless and may be also controlled by the control component 130. The control component 130 may power on or off the smart light bulb socket. In some embodiments, the power unit 206 may include an external power source, e.g., a power network with a household power outlet socket or industrial power outlet socket, or the like, or a combination thereof. In some embodiments, the power unit 206 may include one or more charging apparatus. The power unit 206 may provide direct current (DC) power, or alternating current (AC) power. The power unit 206 may further include one or more other internal components, e.g., a converter, a charge/discharge interface, or the like, or a combination thereof.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. In some embodiments, the lighting-imaging component 120 may also include a reminder module for providing some alarm or indications. It should be noted that the units of the lighting-imaging component 120 may be partially integrated in one or more independent modules or units. In some embodiments, part of the lighting-imaging component 120 may not be necessary, e.g., the storage 205.

Figure 3:
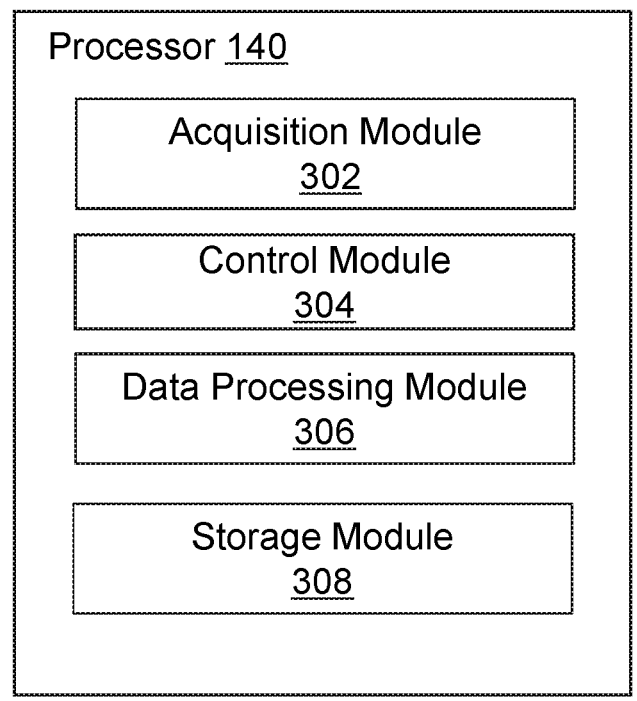
FIG. 3 is a schematic diagram illustrating an exemplary processor according to some embodiments of the present disclosure.
Figure 9:
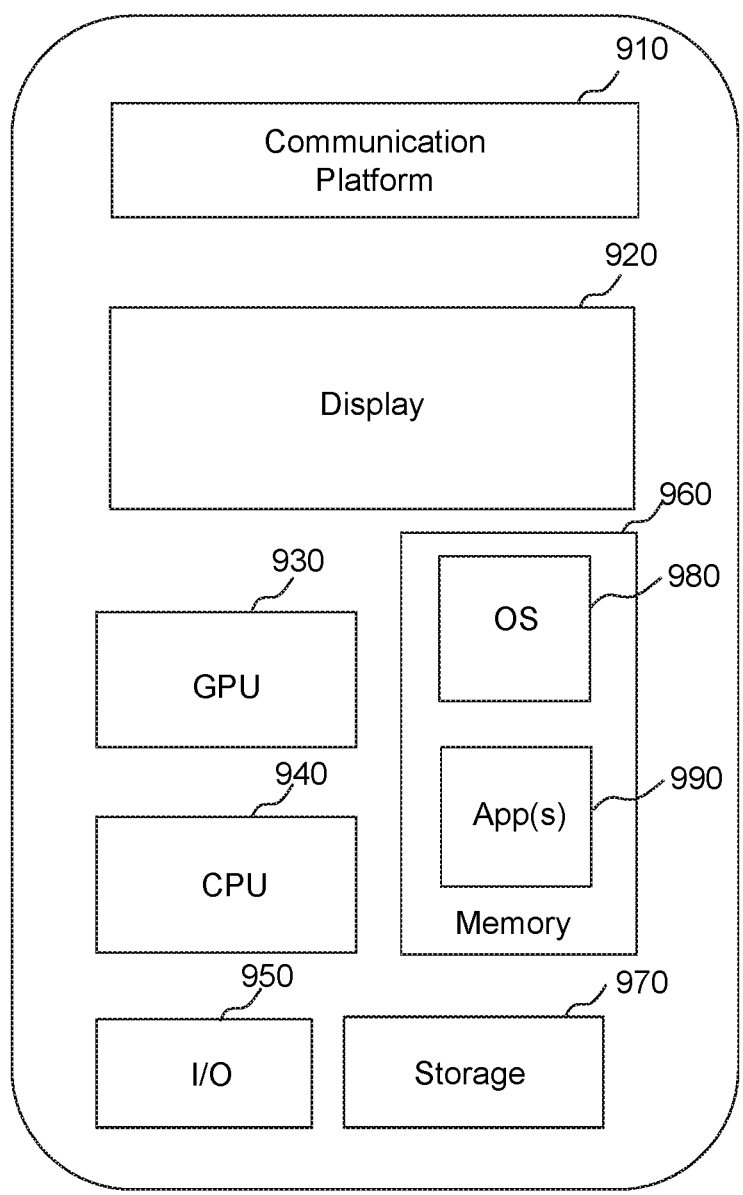
FIG. 9 is a schematic diagram illustrating exemplary hardware and/or software components of an exemplary mobile device on which the terminal(s) may be implemented according to some embodiments of the present disclosure.

FIG. 3 is a schematic diagram illustrating an exemplary processor 140 according to some embodiments of the present disclosure. The processor 140 may include an acquisition module 302, a control module 304, a data processing module 306, and a storage module 308. At least a portion of the processor 140 may be implemented on a computing device as illustrated in FIG. 8 or a mobile device as illustrated in FIG. 9.

The acquisition module 302 may acquire image data. Exemplary image data may include an image, a video, etc., as described elsewhere in the present disclosure. In some embodiments, the acquisition module 302 may acquire the image data captured by the lighting-imaging component 120 (e.g., the one or more imaging device.) In some embodiments, the acquisition module 302 may acquire historical image data from the storage 160, the storage device 780, the terminal(s) 760, and/or an external data source (not shown).

The control module 304 may control operations of the acquisition module 302, the storage module 308, the data processing module 306 (e.g., by generating one or more control parameters), or the like, or a combination thereof. For example, the control module 304 may control the acquisition module 302 to acquire image data. As another example, the control module 304 may control the data processing module 306 to process the image data acquired by the acquisition module 302. In some embodiments, the control module 304 may receive a real-time instruction from an operator or retrieve a predetermined instruction provided by a user (e.g., a doctor) to control one or more operations of the acquisition module 302, and/or the data processing module 306. For example, the control module 304 may control the data processing module 306 to process images and determine whether the images include a motion subject according to the real-time instruction and/or the predetermined instruction. In some embodiments, the control module 304 may communicate with one or more other modules of the processor 140 for exchanging information and/or data.

The storage module 308 may store image data, control parameters, processed image data, or the like, or a combination thereof. In some embodiments, the storage module 308 may store one or more programs and/or instructions that may be executed by the processor(s) of the processor 140 to perform exemplary methods described in this disclosure. For example, the storage module 308 may store program(s) and/or instruction(s) that can be executed by the processor(s) of the processor 140 to acquire image data and detect one or more motion subjects involved in the image data.

The data processing module 306 may process information provided by various modules of the processor 140. The data processing module 306 may process image data acquired by the acquisition module 302, image data retrieved from the storage module 308 and/or the storage 130, etc. In some embodiments, the data processing module 306 may detect motion subjects based on an image captured by an imaging device. Further, the data processing module 306 may determine whether one or more motion subjects are involved in the captured image. In some embodiments, the data processing module 306 may determine a type of the detected motion subjects. In some embodiments, the data processing module 306 may determine a moving track of the detected motion subjects. In some embodiments, the data processing module 306 may also determine one or more lighting parameters of an illuminating device associated with the imaging device in accordance with various embodiments of the present disclosure.

Figure 4:
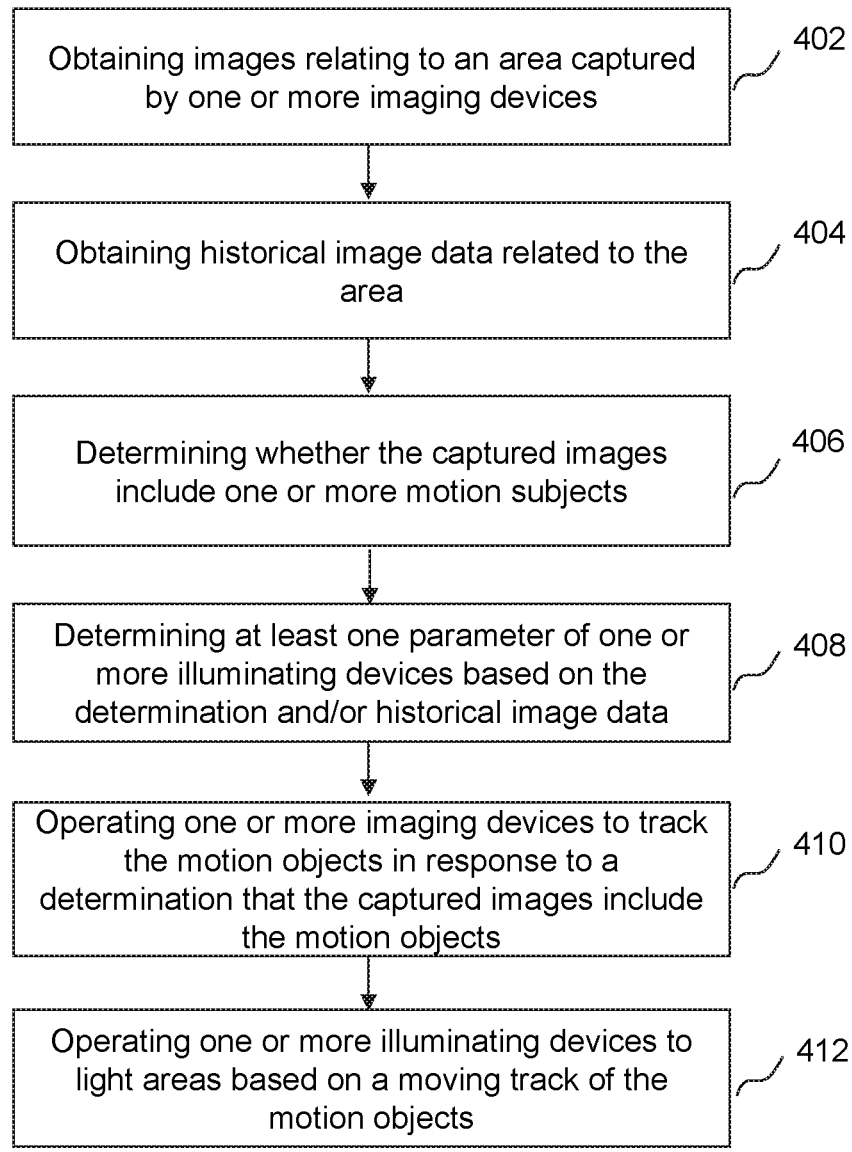
FIG. 4 is a flowchart illustrating an exemplary process for operating one or more illuminating devices based on one or more imaging devices according to some embodiments of the present disclosure.

In some embodiments, one or more modules illustrated in FIG. 4 may be implemented in at least part of the exemplary imaging system as illustrated in FIG. 1. For example, the acquisition module 302, the control module 304, the storage module 308, and/or the data processing module 306 may be integrated into a console (not shown). Via the console, a user may set the parameters for imaging a subject, lighting an area, controlling the lighting parameters of one or more illuminating devices, etc. In some embodiments, the console may be implemented via the processor 140 and/or the terminal(s) 760.

FIG. 4 is a flowchart illustrating an exemplary process 400 for operating one or more illuminating devices based on one or more imaging devices according to some embodiments of the present disclosure. In some embodiments, one or more operations of process 400 illustrated in FIG. 4 may be implemented in the lighting-surveillance system 700 illustrated in FIG. 7. For example, the process 400 illustrated in FIG. 4 may be stored in the storage device 780 in the form of instructions, and invoked and/or executed by the processing device 740 (e.g., the processor 810 of the computing device 800 as illustrated in FIG. 8, the GPU 930 or CPU 940 of the mobile device 900 as illustrated in FIG. 9).

In 402, images relating to an area captured by one or more imaging devices may be obtained. Operation 402 may be performed by the acquisition module 302. In some embodiments, the images relating to an area may include a video. The video may include multiple image sequence (also referred to as image frames) as described elsewhere in the present disclosure (e.g., FIG. 1 and the descriptions thereof). In some embodiments, the area may relate to a house, a parking lot, a street, a lane, a subway station, a shopping mall, etc. In some embodiments, one or more subjects may be represented in the images. The subjects may be organism or non-organism. For example, the subject may include a person, a vehicle, an animal, a physical subject, or the like, or a combination thereof.

In 404, historical image data related to the area may be obtained. Operation 402 may be performed by the acquisition module 302. The historical image data may be obtained from the storage 160, the storage device 780, or any other external storage. In some embodiments, the historical image data relating to the area may be used to perform a statistic with a specific period relating to the subjects involved at the area. For example, the statistic relating to the subjects involved at the area may include a vehicle flowrate, a person flowrate, etc. As another example, the statistic relating to the subjects involved at the area may include a probability when a specific target subject of the subjects involves at the area. As still another example, the statistic relating to the subjects involved at the area may include a frequency of a specific target subject involved at the area at a specific time.

In 406, a determination may be made to as whether the captured images includes one or more motion subjects. Operation 406 may be performed by the data processing module 406. In some embodiments, the data processing module 406 may process the captured images to determine whether the captured images include the motion subjects. For example, the data processing module 406 may process the captured images to identify the motion subjects using one or more motion subject detection algorithms. Exemplary motion subject detection algorithms may include an interframe difference algorithm, a background difference algorithm, an optical flow algorithm, or the like, or a combination thereof. For example, the background difference algorithm may include a temporal difference algorithm, an average filtering algorithm, a W4 algorithm, a Gaussian mixture model algorithm, etc.

In some embodiments, to determine whether the captured images include one or more motion subjects, the processing module 406 may also classify the one or more identified motion subjects to determine a type of the motion subjects. For example, the identified motion subjects may be classified into organism and non-organism. As another example, the identified motion subjects may be classified into persons and animals. As still an example, the identified motion subjects may be classified into a pedestrian and a vehicle, a woman and a man, an adult and a child, etc. In some embodiments, the identified motion subjects may be classified based on one or more one or more features of the identified motion subjects (e.g., shape, size, color, etc.). For example, the identified motion subjects may include a persons and a vehicle. The data processing module 306 may classify the person and the vehicle based on shapes of the person and vehicle.

In 408, at least one parameter of one or more illuminating devices maybe determined based on the determination and/or historical image data. Operation 408 may be performed by the data processing module 306. In some embodiments, at least one parameter of one or more illuminating devices may be adjusted if the captured images include the motion subjects. For example, the illuminating devices may be turned on if the captured images include the motion subjects. As another example, the lighting intensity of the illuminating devices may be increased if the captured images include the motion subjects. In some embodiments, the at least one parameter of one or more illuminating devices may be determined based on a type of the motion subjects. For example, if the motion subjects are vehicles, the light intensity of the illuminating devices may be lower. As another example, if the motion subjects are child, the light color may be determined as a green, a yellow, etc. In some embodiments, the at least one parameter of one or more illuminating devices may be determined based on a moving track of the motion subjects. For example, the illuminating devices located along the moving track of the motion subjects may be turned on one after another based on the moving track. In some embodiments, the at least one parameter of one or more illuminating devices may be determined based on the historical image data associated with the area. For example, if the data processing module 306 determines that a vehicle flow at the area in a specific period is greater based on the historical image data, a switch state of the one or more illuminating devices may be kept on in the specific period. As another example, if the data processing module 306 determines that a person reads book at a specific period, the lighting intensity of the one or more illuminating devices may be set as a specific value in the specific period.

In 410, one or more imaging devices may be operated to track the one or more motion subjects in response to a determination that the captured images include the motion subjects involved. Operation 410 may be performed by the control component 130. In some embodiments, the data processing module 406 may determine a moving track of the motion subjects based on the imaging devices.

In 412, one or more illuminating devices may be operated to light areas based on a moving track of the motion subjects. Operation 412 may be performed by the control component 130. In some embodiments, the moving track of the motion subjects may include a plurality of positions of the motion subjects arriving at. Each of the plurality of positions of the motion subjects arriving at may be installed an imaging device and one of the one or more illuminating devices. Each of the one or more illuminating devices may be operated to light areas the one or more illuminating devices located. For example, the one or more illuminating devices may light one by one along the moving track of the motion subjects.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. In some embodiments, the process 400 may be accomplished with one or more additional operations not described, and/or without one or more of the operations discussed. For example, operations 410-412 may be omitted. In some embodiments, the order of the operations in process 400 may be changed. For example, operation 410 may be performed before operation 408.

Figure 5:
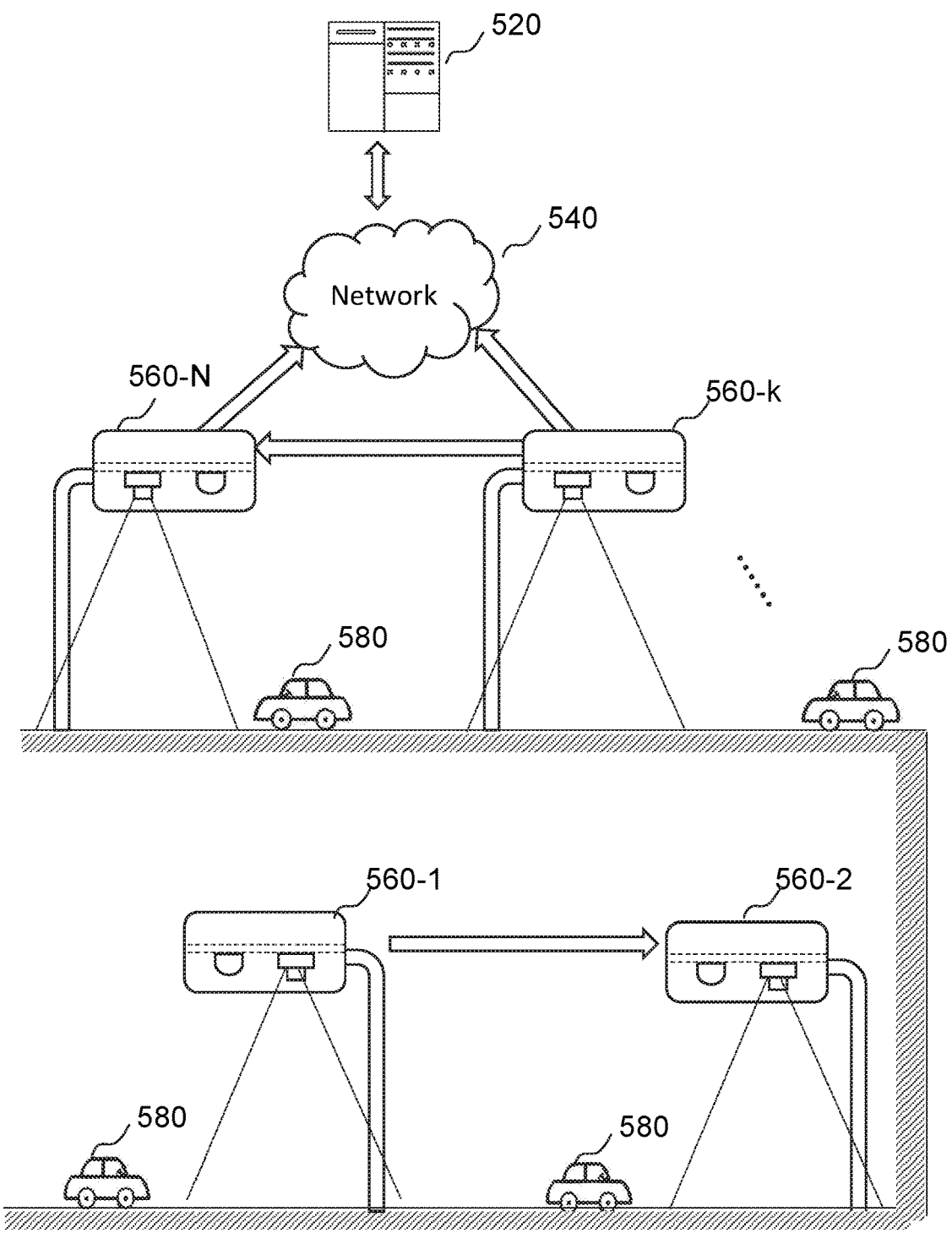
FIG. 5 is a schematic diagram illustrating an exemplary lighting-surveillance system according to some embodiments of the present disclosure.

FIG. 5 is a schematic diagram illustrating an exemplary lighting-surveillance system 500 according to some embodiments of the present disclosure. As shown in FIG. 5, the lighting-surveillance system 500 may include a plurality of lighting-imaging devices, a control device 520, and a network 540. The lighting-surveillance system 500 may be configured in, for example, a part of a market, a shopping mall, a business building, a residential home, a lane, a street, a parking lot, etc. For illustration purpose, a parking lot may be explained as an example for illustrating the lighting-surveillance system 500.

The parking lot may include a plurality of roads. The plurality of lighting-imaging devices (e.g., a lighting-imaging device 560-1, a lighting-imaging device 560-2, . . . , a lighting-imaging device 560-$k$, . . . , a lighting-imaging device 560-N, etc.) may be configured at least one side of the road. Each of the plurality of lighting-imaging devices may include an imaging device and an illuminating device as described elsewhere in the present disclosure.

The control device 520 may be configured to control an operation of the multiple lighting-imaging devices. In some embodiments, the control device 520 may control an imaging device of a lighting-imaging device (e.g., the lighting-imaging device 520-1) to surveille a region in an area associated with the lighting-imaging device (e.g., the lighting-imaging device 620-1). For example, the control device 520 may turn on the imaging device of a lighting-imaging device (e.g., the lighting-imaging device 620-1) based on, for example, an input of an user or according to a default setting of the lighting-surveillance system 500. As another example, the control device 520 may adjust a rotation angle of the imaging device of a lighting-imaging device (e.g., the lighting-imaging device 520-1) based on images captured by the imaging device. As still an example, the control device 520 may determine the location of an empty parking space in the parking lot based on images acquired by the imaging devices.

In some embodiments, the control device 520 may control an illuminating device of a lighting-imaging device (e.g., the lighting-imaging device 520-1) to light an area associated with the lighting-imaging device (e.g., the lighting-imaging device 520-1). In some embodiments, the control device 520 may control an operation of the illuminating device of a lighting-imaging device (e.g., the lighting-imaging device 520-1) based on, for example, an input of an user or according to a default setting of the lighting-surveillance system 500. For example, the control device 520 may set a lighting parameter (e.g., a light intensity, a light color, etc.) according to instructions inputted by a terminal (e.g., a mobile phone of the user). As another example, the control device 520 may turn on or off the illuminating device at a specific time pre-determined by the default setting of the lighting-surveillance system 500.

In some embodiments, the control device 520 may control an illuminating device of a lighting-imaging device (e.g., the lighting-imaging device 560-2) based on operations of other illuminating devices (e.g., the lighting-imaging device 560-1). For example, if the control device 520 determines that the lighting-imaging device 560-1 is turned on, the control device 520 may turn on the illuminating devices of at least one of the lighting-imaging device 560-1, the lighting-imaging device 560-2, . . . , the lighting-imaging device 560-$k$, . . . , the lighting-imaging device 660-N. As another example, the control device 520 may turn on an illuminating device (e.g., the lighting-imaging device 560-2) based on operation of an adjacent illuminating device (e.g., the lighting-imaging device 560-1).

In some embodiments, the control device 520 may control the illuminating device of a lighting-imaging device (e.g., the lighting-imaging device 560-N) based on images captured by an imaging device of the lighting-imaging device (e.g., the lighting-imaging device 560-N) or other lighting-imaging devices (e.g., the lighting-imaging device 560-1, the lighting-imaging device 560-2, etc.). For example, the control device 520 may determine whether there is a vehicle represented in images captured by the imaging device of the lighting-imaging device 560-1 located at the entrance of the parking lot. The control device 520 may turn on the illuminating device of the lighting-imaging device 560-1 if the control device 520 determines that a vehicle is close to the entrance of the parking lot based on the captured images. As a further example, the control device 520 may turn on the illuminating devices of the lighting-imaging device 560-2, the lighting-imaging device 560-*k*, etc., if the control device 520 determines that the vehicle enters the parking lot.

In some embodiments, the control device 520 may operate an illuminating device of a lighting-imaging device (e.g., the lighting-imaging device 510-1) based on historical image data acquired by the imaging device of the lighting-imaging device (e.g., the lighting-imaging device 510-1). For example, the control device 520 may determine a vehicle flow with different periods at the entrance of the parking lot based on the historical image data acquired by the imaging device of the lighting-imaging device 510-1. The control device 520 may set one or more parameters of the illuminating device of the lighting-imaging device 510-1 based on the vehicle flow with different periods at the area. For a further example, the control device 520 may set a switch state being off if the vehicle flow with a specific period at the area is lower or zero.

In some embodiments, the control device 520 may provide a navigation route associated with an empty parking space to a user. For example, the control device 520 may determine the navigation route associated with an empty parking space. Then, the control device 520 may set switch states of illuminating devices associated with the navigation route being on one after another or synchronously.

The network 540 may be configured to establish communication links. The control device 540 may be connected to and/or communicate with the multiple lighting-imaging components via one or more communication links. In some embodiments, an imaging device may be connected and/or communicate with an illuminating device via the communication links. The network 540 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network (VPN), a satellite network, a telephone network, routers, hubs, witches, server computers, and/or any combination thereof.

Figure 6:
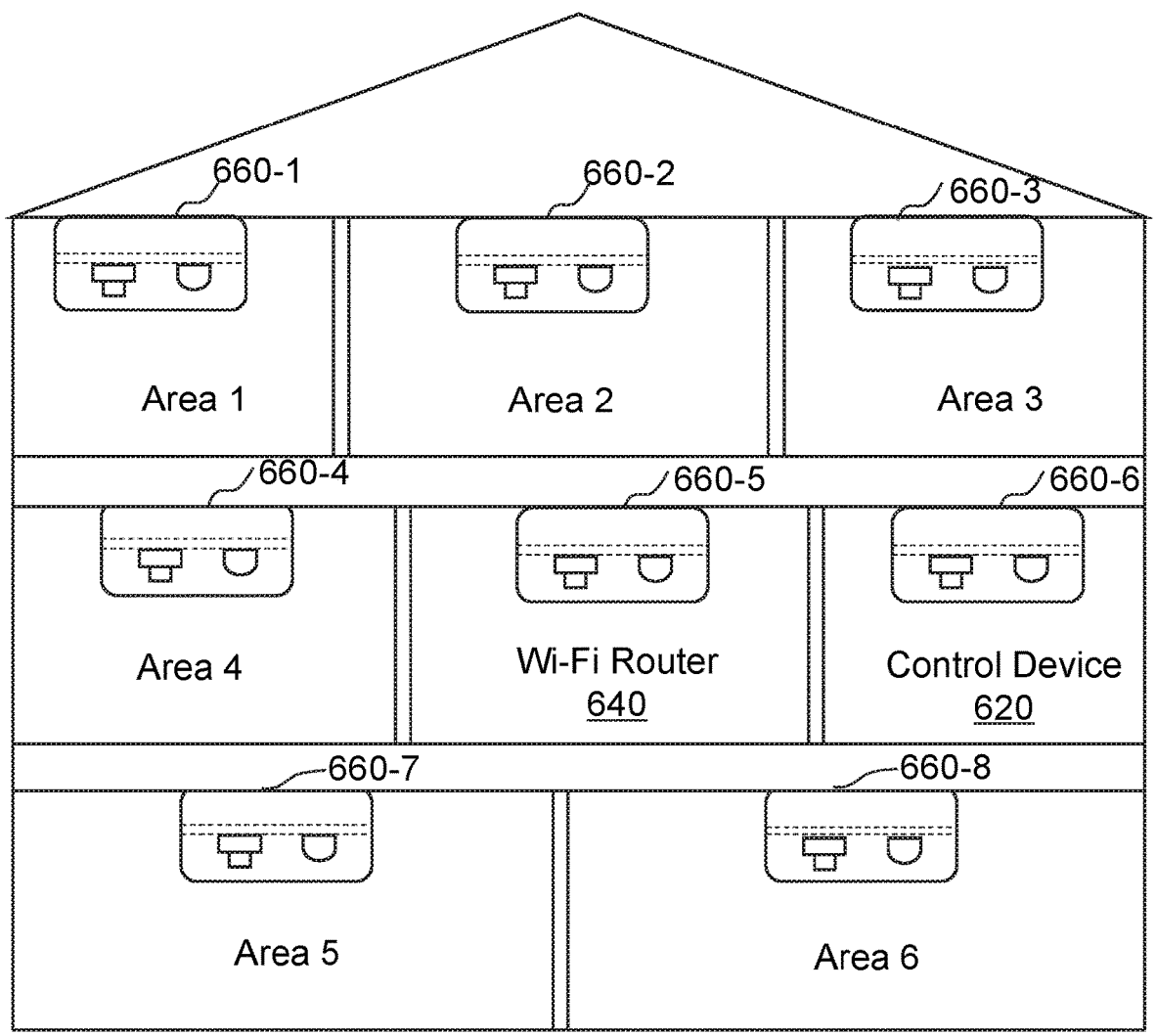
FIG. 6 is a schematic diagram illustrating another exemplary lighting-surveillance system in accordance with some embodiments of the present disclosure.

FIG. 6 is a schematic diagram illustrating another exemplary lighting-surveillance system 600 in accordance with some embodiments of the present disclosure. As shown in FIG. 6, the lighting-surveillance system 600 may include multiples lighting-imaging devices (e.g., a first lighting-imaging device 660-1, a second lighting-imaging device 660-2, a third lighting-imaging device 660-3, a fourth lighting-imaging device 660-4, a fifth lighting-imaging device 660-5, a sixth lighting-imaging device 660-6, a seventh lighting-imaging device 660-7, a eighth lighting-imaging device 660-8, etc.), a control device 620, and a Wi-Fi router 640. The lighting-surveillance system 600 may be configured in, for example, a part of a market, a shopping mall, a business building, a residential home, a lane, a street, etc. For illustration purpose, a residential home may be explained as an example for illustrating the lighting-surveillance system 600.

A residential home as shown in FIG. 6 may include multiple areas, for example, Area 1, Area 2, Area 3, Area 4, Area 5, and Area 6. The multiple areas may include a bedroom, a kitchen, a study room, a bathroom, a living room, a garage, a porch, etc. In some embodiments, each of the multiple areas of the residential home may be configured with one lighting-imaging device. For example, the first lighting-imaging device 660-1 may be installed in the Area 1. A lighting-imaging device may include an imaging device and an illuminating device as described elsewhere in the present disclosure (e.g., FIGS. 1-3 and the descriptions thereof). For example, the imaging device may include a video camera. The illuminating device may include a plurality of LEDs.

The control device 620 may be configured to control the operations of the multiple lighting-imaging devices. In some embodiments, the control device 620 may control an imaging device of a lighting-imaging device (e.g., the first lighting-imaging device 620-1) to surveille a region in an area associated with the lighting-imaging device (e.g., the first lighting-imaging device 620-1). For example, the control device 620 may turn on the imaging device of a lighting-imaging device (e.g., the first lighting-imaging device 620-1) based on, for example, an input of an user or according to a default setting of the lighting-surveillance system 600. As another example, the control device 620 may adjust a rotation angle of the imaging device of a lighting-imaging device (e.g., the first lighting-imaging device 620-1) based on images captured by the imaging device.

In some embodiments, the control device 620 may control an illuminating device of a lighting-imaging device (e.g., the first lighting-imaging device 620-1) to light an area associated with the lighting-imaging component (e.g., the first lighting-imaging device 620-1). In some embodiments, the control device 620 may control an operation of the illuminating device of a lighting-imaging component (e.g., the first lighting-imaging device 620-1) based on, for example, an input of an user or according to a default setting of the lighting-surveillance system 600. For example, the control device 620 may set a lighting parameter (e.g., a light intensity, a light color, etc.) according to instructions inputted by a terminal (e.g., a mobile phone of the user). As another example, the control device 620 may turn on or off the illuminating device at a specific time pre-determined by the default setting of the lighting-surveillance system 600.

In some embodiments, the control device 620 may control an illuminating device of a lighting-imaging device (e.g., the first lighting-imaging component 660-1) based on operations of other illuminating devices (e.g., the eighth lighting-imaging device 660-8). For example, if the control device 620 determines that the eighth lighting-imaging device 660-8 is turned on, the control device 620 may turn on the illuminating devices of at least one of the first lighting-imaging device 660-1, the second lighting-imaging device 660-2, the third lighting-imaging device 660-3, the fourth lighting-imaging device 660-4, the fifth lighting-imaging device 660-5, the sixth lighting-imaging device 660-6, or the seventh lighting-imaging device 660-7).

In some embodiments, the control device 620 may control an illuminating device of a lighting-imaging device (e.g., the first lighting-imaging device 660-1) based on images captured by an imaging device of the lighting-imaging device (e.g., the first lighting-imaging device 660-1) or other lighting-imaging devices (e.g., the second lighting-imaging device 660-2, the third lighting-imaging device 660-3, etc.). For example, the control device 620 may determine whether there is a motion subject (e.g., a person) represented in an image captured by the imaging device of the first lighting-imaging device 660-1. The control device 620 may turn on the illuminating device of the first lighting-imaging component 660-1 if there is a motion subject (e.g., a person) represented in the image. As a further example, the control device 620 may turn on the illuminating device of the second lighting-imaging device 660-2, the third lighting-imaging device 660-3, etc., if there is a motion subject (e.g., a person) represented in the image. As still an example, the control device 620 may further determine a type of the motion subject (e.g., a person). The type of the motion subject may include an adult, a child, a master of the residence home, a stranger, etc. The control device 620 may set personalized lighting parameters according to different types of the motion subject. For example, if the control device 620 determines that a motion subject in the Area 2 is a child based on images captured by the imaging device of the second lighting-imaging device 660-2, the lighting intensity of the illuminating device of the second lighting-imaging device 660-2 may be lower, the color temperature of the illuminating device of the second lighting-imaging device 660-2 may be softer, etc.

In some embodiments, the control device 620 may identify an event associated with one or more motion subjects (e.g., persons) based on the images captured by the imaging device of a lighting-imaging device (e.g., the first lighting-imaging device 660-1). The control device 620 may further control the illuminating device of the lighting-imaging device (e.g., the first lighting-imaging device 660-1) based on the event associated with the motion subjects (e.g., persons). The event may include watching TV, reading book, eating, fighting, exercise, writing, etc. For example, the control device 620 may determine that the motion subjects are watching TV at the Area 4 (e.g., a living room) based on images acquired by the imaging device of the fourth lighting-imaging device 660-4. Then the control device 620 may adjust one or more parameters (e.g., the light intensity, the lighting color, the lighting angle, etc.) of the illuminating device of the lighting-imaging device 660-4 according to one or more parameters (e.g., size, color, brightness, etc.) of the TV automatically or default setting of the lighting-surveillance system 600. As another example, the control device 620 may determine that a motion subject is listening music at the Area 3 (e.g., a bedroom) images acquired by the imaging device of the lighting-imaging device 660-3. The control device 620 may turn off the illuminating device of the third lighting-imaging device 660-3 or decrease the light intensity of the illuminating device of the third lighting-imaging device 660-3.

In some embodiments, the control device 620 may be fixed to an area (e.g., the Area 8). In some embodiments, the control device 620 may be integrated into a terminal of a user. For example, the terminal of the user may include a smart mobile phone, a tablet computer, a personal digital assistant, a desktop computer, or the like, or a combination thereof. In some embodiments, the control device 620 may be integrated into a lighting-imaging device (e.g., the sixth lighting-imaging device 660-6). In some embodiments, the control device 620 may include a processor configured to processing data (e.g., images acquired by an imaging device). For example, the processor may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), etc.

The Wi-Fi router 640 may be configured to establish communication links. The control device 620 may be connected to and/or communicate with the multiple lighting-imaging device s via one or more communication links. In some embodiments, an imaging device may be connected and/or communicate with an illuminating device via the communication links.

Figure 7:
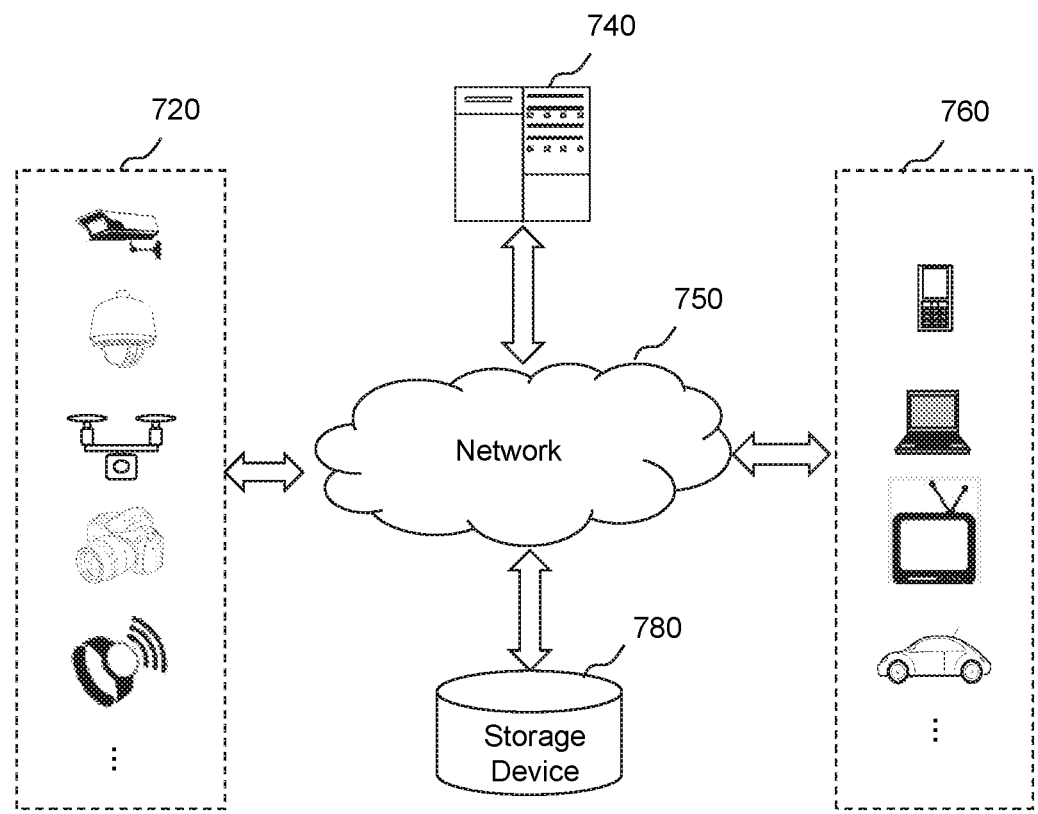
FIG. 7 is a schematic diagram illustrating another exemplary lighting-surveillance system in accordance with some embodiments of the present disclosure.

FIG. 7 is a schematic diagram illustrating an exemplary lighting-surveillance system 700 according to some embodiments of the present disclosure. As shown, the lighting-surveillance system 700 may include a lighting-imaging device 720, a processing device 740, a network 750, one or more terminal(s) 760, and a storage device 780. In some embodiments, the lighting-imaging device 720, the processing device 740, the storage device 780, and/or the terminal(s) 760 may be connected to and/or communicate with each other via a wireless connection (e.g., the network 750), a wired connection, or a combination thereof. The connection between the components in the lighting-surveillance system 700 may be variable. Merely by way of example, the lighting-imaging device 720 may be connected to the processing device 740 through the network 750, as illustrated in FIG. 5. As another example, the lighting-imaging device 720 may be connected to the processing device 740 directly. As a further example, the storage device 780 may be connected to the processing device 740 through the network 750, as illustrated in FIG. 7, or connected to the processing device 740 directly. As still a further example, the terminal(s) 760 may be connected to the processing device 740 through the network 750, as illustrated in FIG. 7, or connected to the processing device 740 directly.

The lighting-imaging device 720 may be positioned to perform lighting and/or surveillance of an area of interest (AOI). In some embodiments, the AOI may be indoor or outdoor. For example, the AOI may include at least one portion of a room, a shopping mall, a street, a park, a subway station, a parking lot, etc. The subject may be organism or non-organism. For example, the subject may include a person, a vehicle, an animal, a physical subject, or the like, or a combination thereof. In some embodiments, the lighting-imaging device 720 may include one or more imaging devices and/or one or more illuminating device as described elsewhere in the present disclosure (e.g., FIGS. 1-2 and the descriptions thereof).

The processing device 740 may process data and/or information obtained from the lighting-imaging device 720, the storage device 780, and/or the terminal(s) 760. For example, the processing device 740 may detect and classify subjects in the image data acquired from the lighting-imaging device 720. As another example, the processing device 740 may calibrate the lighting-imaging device 720 based on detected subjects reflected in the image data collected by the lighting-imaging device 720. In some embodiments, the processing device 740 may be a single server or a server group. The server group may be centralized or distributed. In some embodiments, the processing device 740 may be local or remote. For example, the processing device 740 may access information and/or data from the lighting-imaging device 720, the storage device 780, and/or the terminal(s) 760 via the network 750. As another example, the processing device 740 may be directly connected to the lighting-imaging device 720, the terminal(s) 760, and/or the storage device 780 to access information and/or data. In some embodiments, the processing device 740 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 740 may be implemented by a computing device 800 having one or more components as described in connection with FIG. 9.

The storage device 780 may store data, instructions, and/or any other information. In some embodiments, the storage device 780 may store data obtained from the processing device 740, and the terminal(s) 760. For example, the storage device 780 may store image data relating to an area acquired by the lighting-imaging device 720. As another example, the storage device 780 may store parameters of a camera determined by the processing device 740. In some embodiments, the storage device 780 may store data and/or instructions that the processing device 740 may execute or use to perform exemplary methods described in the present disclosure. For example, the storage device 780 may store instructions that the processing device 740 may execute or use to determine lighting parameters of an illuminating device. In some embodiments, the storage device 780 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 580 may be implemented on a cloud platform as described elsewhere in the disclosure.

In some embodiments, the storage device 780 may be connected to the network 750 to communicate with one or more other components in the lighting-surveillance system 700 (e.g., the processing device 740, the terminal(s) 760, etc.). One or more components in the lighting-surveillance system 700 may access the data or instructions stored in the storage device 780 via the network 750. In some embodiments, the storage device 780 may be part of the processing device 740.

The terminal(s) 760 may be connected to and/or communicate with the lighting-imaging device 720, the processing device 740, and/or the storage device 780. For example, the terminal(s) 760 may obtain image data acquired by the imaging devices of the lighting-imaging device 720 and transmit the image data to the processing device 740 to be processed. As another example, the terminal(s) 760 may obtain a processed image from the processing device 740. As still another example, the terminal(s) 760 may obtain lighting parameters of an illuminating device determined by the processing device 740. In some embodiments, the terminal(s) 760 may include a mobile device, a tablet computer, a laptop computer, or the like, or any combination thereof. For example, the mobile device may include a mobile phone, a personal digital assistance (PDA), a gaming device, a navigation device, a point of sale (POS) device, a laptop, a tablet computer, a desktop, or the like, or any combination thereof. In some embodiments, the terminal(s) 760 may include an input device, an output device, etc. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to the processing device 740 via, for example, a bus, for further processing. Other types of the input device may include a cursor control device, such as a mouse, a trackball, or cursor direction keys, etc. The output device may include a display, a speaker, a printer, or the like, or a combination thereof. In some embodiments, the terminal(s) 760 may be part of the processing device 740.

The network 750 may include any suitable network that can facilitate exchange of information and/or data for the lighting-surveillance system 700. In some embodiments, one or more components of the lighting-surveillance system 700 (e.g., the lighting-imaging device 720, the processing device 740, the storage device 780, the terminal(s) 760, etc.) may communicate information and/or data with one or more other components of the lighting-surveillance system 700 via the network 750. For example, the processing device 740 may obtain image data from the lighting-imaging device 720 via the network 750. As another example, the processing device 740 may obtain user instruction(s) from the terminal(s) 760 via the network 750. The network 750 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network (VPN), a satellite network, a telephone network, routers, hubs, witches, server computers, and/or any combination thereof. For example, the network 750 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 750 may include one or more network access points. For example, the network 750 may include wired and/or wireless network access points such as base stations and/or internet exchange points through which one or more components of the lighting-surveillance system 700 may be connected to the network 750 to exchange data and/or information.

It should be noted that the lighting-surveillance system 700 is merely provided for the purposes of illustration, and is not intended to limit the scope of the present disclosure. For persons having ordinary skills in the art, multiple variations or modifications may be made under the teachings of the present disclosure. For example, the lighting-surveillance system 700 may further include a database, an information source, or the like. As another example, the lighting-surveillance system 700 may be implemented on other devices to realize similar or different functions. However, those variations and modifications do not depart from the scope of the present disclosure.

FIG. 8 is a schematic diagram illustrating exemplary hardware and/or software components of an exemplary computing device 800 on which the processing device 740 may be implemented according to some embodiments of the present disclosure. As illustrated in FIG. 8, the computing device 800 may include a processor 810, a storage 820, an input/output (I/O) 830, and a communication port 640.

The processor 810 may execute computer instructions (e.g., program code) and perform functions of the processing device 740 in accordance with techniques described herein. The computer instructions may include, for example, routines, programs, subjects, components, data structures, procedures, modules, and functions, which perform particular functions described herein. For example, the processor 810 may process image data obtained from the lighting-imaging device 720, the storage device 780, terminal(s) 760, and/or any other component of the lighting-surveillance system 700. In some embodiments, the processor 810 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or a combinations thereof.

Merely for illustration, only one processor is described in the computing device 800. However, it should be noted that the computing device 800 in the present disclosure may also include multiple processors, thus operations and/or method steps that are performed by one processor as described in the present disclosure may also be jointly or separately performed by the multiple processors. For example, if in the present disclosure the processor of the computing device 600 executes both operation A and operation B, it should be understood that operation A and operation B may also be performed by two or more different processors jointly or separately in the computing device 800 (e.g., a first processor executes operation A and a second processor executes operation B, or the first and second processors jointly execute operations A and B).

The storage 820 may store data/information obtained from the lighting-imaging device 720, the storage device 780, the terminal(s) 760, and/or any other component of the lighting-surveillance system 700. In some embodiments, the storage 820 may include a mass storage, a removable storage, a volatile read-and-write memory, a read-only memory (ROM), or the like, or a combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 820 may store one or more programs and/or instructions to perform exemplary methods described in the present disclosure. For example, the storage 820 may store a program for the processing device 740 for determining a target flip angle schedule.

The I/O 830 may input and/or output signals, data, information, etc. In some embodiments, the I/O 830 may enable a user interaction with the processing device 740. In some embodiments, the I/O 830 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 840 may be connected to a network (e.g., the network 750) to facilitate data communications. The communication port 640 may establish connections between the processing device 740 and the lighting-imaging device 720, the storage device 780, and/or the terminal(s) 760. The connection may be a wired connection, a wireless connection, any other communication connection that can enable data transmission and/or reception, and/or a combination of these connections. The wired connection may include, for example, an electrical cable, an optical cable, a telephone wire, or the like, or a combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 640 may be and/or include a standardized communication port, such as RS232, RS485, etc. In some embodiments, the communication port 640 may be a specially designed communication port. For example, the communication port 840 may be designed in accordance with the digital imaging and communications in medicine (DICOM) protocol.

FIG. 9 is a schematic diagram illustrating exemplary hardware and/or software components of an exemplary mobile device 900 on which the terminal(s) 760 may be implemented according to some embodiments of the present disclosure. As illustrated in FIG. 9, the mobile device 900 may include a communication platform 910, a display 920, a graphic processing unit (GPU) 930, a central processing unit (CPU) 940, an I/O 950, a memory 960, and a storage 970. In some embodiments, any other suitable component, including but not limited to a system bus or a controller (not shown), may also be included in the mobile device 900. In some embodiments, a mobile operating system 980 (e.g., iOS™, Android™, Windows Phone™, etc.) and one or more applications 990 may be loaded into the memory 960 from the storage 990 in order to be executed by the CPU 940. The applications 980 may include a browser or any other suitable mobile apps for receiving and rendering information relating to image processing or other information from the processing device 940. User interactions with the information stream may be achieved via the I/O 950 and provided to the processing device 740 and/or other components of the lighting-surveillance system 700 via the network 750.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an subject oriented programming language such as Java, Scala, Smalltalk, Eiffel, JADE, Emerald, C++, C#, VB.NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

I claim:

1. A system for lighting control, comprising: a non-transitory storage medium storing executable instructions for lighting control; a communication component operatively connected to the non-transitory storage medium; at least one imaging device configured to capture image data related to an area; one or more illuminating devices configured to light the area; at least one processor in communication with the non-transitory storage medium, when executing the executable instructions, the at least one processor is directed to: obtain image data relating to the area captured by the at least one imaging device; determine whether the captured image data includes a motion subject; determine at least one parameter relating to at least one of the one or more illuminating devices based on the determination; and in response to a determination that the captured image data includes a motion subject, a control component configured to operate the at least one imaging device to track the motion subject; and operate the at least one of the one or more illuminating devices to light the area based on a moving track of the motion subject, wherein the moving track includes a plurality of positions of the motion subject arriving at, each of which is installed the at least one imaging device and the at least one of the one or more illuminating devices.

2. The system of claim 1, wherein the control component is further configured to set the at least one parameter relating to the at least one of the one or more illuminating devices including at least one of:
   a switch state of the at least one of the one or more illuminating devices,
   a light intensity of the at least one of the one or more illuminating devices,
   a lighting area of the at least one of the one or more illuminating devices, and
   a light color of the at least one of the one or more illuminating devices.

3. The system of claim 1, wherein each of the one or more illuminating devices include a plurality of light emitting diodes (LEDs), each of the plurality of LEDs being operated independently by the control component.

4. The system of claim 3, wherein the control component is further directed to adjust a lighting parameter relating to at least one of the plurality of light emitting diodes.

5. The system of claim 1, wherein the at least one processor is further directed to:
   determine a type of a subject in the captured image data;
   determine the at least one parameter relating to the at least one of the one or more illuminating devices based on the type of the subject.

6. The system of claim 1, wherein the at least one processor is further directed to:
   determine a breakdown of the one or more illuminating devices based on the captured image data.

7. The system of claim 1, wherein the at least one processor is further directed to:
   receive instructions from one or more user terminals via the communication component; and
   determine the at least one parameter relating to the at least one of the one or more illuminating devices based on the instructions.

8. The system of claim 1, wherein the control component is coupled to the at least one of the one or more illuminating devices.

9. The system of claim 1, wherein the at least one imaging device is coupled to the at least one of the one or more illuminating devices and share a power source with the at least one of the one or more illuminating devices.

10. The system of claim 1, wherein the at least one processor is further directed to
   obtain historical image data of the area from a database; and
   determine the at least one parameter relating to the at least one of the one or more illuminating devices based on the historical image data.

11. A method implemented on a computing device having at least one processor and at least one computer-readable storage medium for lighting control, the method comprising: obtaining image data relating to an area captured by at least one imaging device; determining whether the captured image data include a motion subject; determining at least one parameter relating to at least one of each of the one or more illuminating devices based on the determination; and in response to a determination that the captured image data includes a motion subject; operating the at least one imaging device to track the motion subject and operating the at least one of the one or more illuminating devices to light the area based on a moving track of the motion subject, wherein the moving track includes a plurality of positions of the motion subject arriving at, each of which is installed the at least one imaging device and the at least one of the one or more illuminating devices.

12. The method of claim 11, wherein the at least one parameter relating to the at least one of the one or more illuminating devices includes at least one of:
   a switch state of the at least one of the one or more illuminating devices,
   a light intensity of the at least one of the one or more illuminating devices,
   a lighting area of the at least one of the one or more illuminating devices, and
   a light color of the at least one of the one or more illuminating devices.

13. The method of claim 11, wherein each of the one or more illuminating devices include a plurality of light emitting diodes (LEDs), and the method further includes:
   adjusting a lighting parameter relating to at least one of the plurality of light emitting diodes.

14. The method of claim 11, further comprising:
   operating the at least one of the one or more illuminating devices to light the area based on a type of subject in the captured image data.

15. The method of claim 11, further comprising:
   determining a breakdown of the one or more illuminating devices based on the captured image data.

16. The method of claim 11, further comprising:
   receiving instructions from one or more user terminals via the communication component; and
   determining the at least one parameter relating to the at least one of the one or more illuminating devices based on the instructions.

17. The method of claim 11, further comprising:
   obtaining historical image data of the area from a database; and
   determining the at least one parameter relating to the at least one of the one or more illuminating devices based on the historical image data.

18. A non-transitory computer readable medium, comprising: instructions being executed by at least one processor, causing the at least one processor to implement a method for lighting control, comprising: obtaining image data relating to an area captured by at least one imaging device; determining whether the captured image data includes a motion subject; determining at least one parameter relating to at least one each of the one or more illuminating devices based on the determination; and in response to a determination that the captured image data includes a motion subject; operating the at least one imaging device to track the motion subject; and operating the at least one of the one or more illuminating devices to light the area based on a moving track of the motion subject, wherein the moving track include a plurality of positions of the motion subject arriving at, each of which is installed the at least one imaging device and the at least one of the one or more illuminating devices.

19. The non-transitory computer readable medium of claim 18, further comprising:
   receiving instructions from one or more user terminals via the communication component; and
   determining the at least one parameter relating to the at least one of the one or more illuminating devices based on the instructions.

* * * * *